(12) United States Patent
Groom et al.

(10) Patent No.: US 12,742,505 B2
(45) Date of Patent: Sep. 22, 2026

(54) MULTI-WAY DISC VALVE WITH FLOW CONTROLLER

(71) Applicant: Stant USA Corp., Connersville, IN (US)

(72) Inventors: J Bradley Groom, Connersville, IN (US); George J. Mitri, Connersville, IN (US)

(73) Assignee: Stant USA Corp., Connersville, IN (US)

(*) Notice: Subject to any disclaimer, the term of this patent is extended or adjusted under 35 U.S.C. 154(b) by 113 days.

(21) Appl. No.: 18/942,897

(22) Filed: Nov. 11, 2024

(65) Prior Publication Data

US 2025/0155033 A1 May 15, 2025

Related U.S. Application Data

(60) Provisional application No. 63/597,948, filed on Nov. 10, 2023.

(51) Int. Cl.
*F16K 11/074* (2006.01)
*F16K 3/10* (2006.01)

(52) U.S. Cl.
CPC ............ *F16K 11/0743* (2013.01); *F16K 3/10* (2013.01); *Y10T 137/86863* (2015.04)

(58) Field of Classification Search
CPC ..... Y10T 137/86863; Y10T 137/86509; F16K 11/0743
See application file for complete search history.

(56) References Cited

U.S. PATENT DOCUMENTS

| | | | | |
|---|---|---|---|---|
| 282,313 | A * | 7/1883 | Haynes | B01D 35/143 210/91 |
| 2,451,678 | A * | 10/1948 | Johnson | F16K 11/0743 D23/245 |
| 3,911,956 | A * | 10/1975 | LeBreton | F16K 11/0743 210/411 |
| 4,431,028 | A | 2/1984 | Hendrick | |
| 4,674,538 | A * | 6/1987 | Yes | F16K 11/0743 137/625.46 |
| 5,431,189 | A | 7/1995 | Jones | |
| 5,529,758 | A | 6/1996 | Houston | |

(Continued)

FOREIGN PATENT DOCUMENTS

| | | |
|---|---|---|
| CN | 214743520 U | 11/2021 |
| CN | 214999563 U | 12/2021 |

(Continued)

OTHER PUBLICATIONS

Extended European Search Report completed Mar. 1, 2025 and issued in connection with European Patent Appln. No. 24210707.6, 13 pages.

*Primary Examiner* — Robert K Arundale
(74) *Attorney, Agent, or Firm* — Barnes & Thornburg

(57) ABSTRACT

A multi-way valve includes a valve housing, a valve flow controller, and flow regulator. The valve housing is shaped to include a valve cavity and a plurality of apertures that open into the valve cavity. The valve flow controller is arranged in the valve housing to control flow through the valve housing. The flow regulator is configured to control a flow rate of fluid entering one flow path of a plurality of flow paths through the multi-way valve when the valve rotor is rotated.

15 Claims, 12 Drawing Sheets

(56) References Cited

U.S. PATENT DOCUMENTS

| | | | | |
|---|---|---|---|---|
| 6,186,174 | B1 * | 2/2001 | Yurchision ................ | F16K 3/10<br>137/625.46 |
| 2017/0089474 | A1 | 3/2017 | Zhan et al. | |
| 2022/0390026 | A1 | 12/2022 | Chapman | |
| 2023/0193906 | A1 * | 6/2023 | Chapman ............ | F04D 15/0038<br>123/450 |
| 2024/0117888 | A1 | 4/2024 | Brock et al. | |
| 2024/0263709 | A1 | 8/2024 | Mitri et al. | |
| 2024/0318733 | A1 | 9/2024 | Brock et al. | |

FOREIGN PATENT DOCUMENTS

| | | | |
|---|---|---|---|
| CN | 215950468 | U | 3/2022 |
| CN | 217207877 | U | 8/2022 |
| CN | 217539713 | U | 10/2022 |
| CN | 114635991 | B | 3/2023 |
| CN | 221780053 | U | 9/2024 |
| DE | 10153222 | B4 | 7/2012 |
| DE | 202014102795 | U1 | 6/2014 |
| EP | 4198357 | A1 | 6/2023 |
| JP | 2002022041 | A | 1/2002 |
| WO | 1997011262 | A1 | 3/1997 |

* cited by examiner

MULTI-WAY DISC VALVE WITH FLOW CONTROLLER

PRIORITY CLAIM

This application claims priority to and the benefit of U.S. Provisional Patent Application 63/597,948 filed Nov. 10, 2023, which is expressly incorporated by reference herein.

TECHNICAL FIELD

The present disclosure relates to multi-way valves, and particularly to multi-way valves for controlling the flow of heating and/or cooling fluid to various thermal fluid circuits in a vehicle. More particularly, the present disclosure relates to an electromechanical multi-way valve.

BACKGROUND

Multi-way valves are used for controlling the flow of fluid to various thermal fluid circuits in a vehicle. However, there is a need for multi-way valves with an increased number of possible flow paths and improved flow rate control.

SUMMARY

The present disclosure may comprise one or more of the following features and combinations thereof.

A multi-way valve that controls the flow of heating and/or cooling fluid to different thermal fluid circuits with regulating means for controlling a flow rate of fluid entering one flow path of the plurality of flow paths through the multi-way valve when the valve rotor is rotated between different predetermined positions so that the flow rate through the one flow path is increased while lowering the pressure in the multi-way valve. The multi-way valve may include a valve housing and a valve flow controller. The valve housing of the multi-way valve may be coupled to a manifold of thermal fluid circuits.

In some embodiments, the valve housing may be shaped to include a valve cavity and a plurality of apertures. The plurality of apertures may extend axially through the valve housing and open into the valve cavity.

In some embodiments, the valve flow controller may include a valve rotor arranged in the valve cavity of the valve housing body. The valve rotor may be configured to rotate relative to the valve housing body about a valve axis. The valve flow controller may further include an actuator coupled to the valve rotor to drive rotation of the valve rotor about the valve axis. The valve rotor may cooperate with the valve housing to define a plurality of flow paths when the valve rotor is rotated about the valve axis to a plurality of different predetermined positions to control a flow of fluid through the valve housing.

In some embodiments, the multi-way valve may include regulating means for controlling a flow rate of fluid entering one flow path of the plurality of flow paths through the multi-way valve when the valve rotor is rotated from one position included in the plurality of different predetermined positions to another position included in the plurality of different predetermined positions. In this way, the flow rate through the one flow path is increased while lowering the pressure in the multi-way valve.

In some embodiments, the valve rotor may include a valve rotor body and a valve rotor shaft that extends axially relative to the valve axis. The valve rotor body may include a valve rotor disc plate that extends circumferentially about the valve axis and a weir shell. The weir shell may extend around at least two apertures included in the plurality of apertures that open into the valve cavity when the valve rotor is in each of the plurality of different predetermined positions. The weir shell may provide the regulating means for controlling flow rate of fluid entering one of the plurality of flow paths through the multi-way valve.

In some embodiments, the weir shell may include a shell body wall that defines a main cavity and shell end walls that each defined an end cavity in fluid communication with the main cavity. Each shell end wall may be shaped to control flow from the main cavity to the end cavity in accordance with a preselected flow area curve. In some embodiments, each shell end wall may have a first section and a second section that extend from the shell body wall and converge at an intersection point. An intersection angle may be defined between the first section and the second section. In some embodiments, the intersection angle is less than 90 degrees.

In some embodiments, each shell end wall may extend from the valve disc rotor plate to the shell body wall at a weir angle relative to the valve disc rotor plate. In some embodiments, the weir angle is less than 90 degrees.

In some embodiments, the valve rotor disc plate may be shaped to include a through hole. The through hole may be spaced apart from the weir shell. The through hole may extend axially through the valve rotor disc and circumferentially partway about the axis.

In some embodiments, the plurality of apertures formed in the valve housing includes at least four apertures. In some embodiments, the plurality of apertures formed in the valve housing includes at least five apertures. In some embodiments, the plurality of apertures formed in the valve housing includes at least six apertures.

According to another aspect of the present disclosure, a multi-way valve may include a valve housing coupled to a manifold of thermal fluid circuits and a valve flow controller. The valve housing may be shaped to include a valve cavity and a plurality of apertures that open into the valve cavity. The valve flow controller may include a valve rotor arranged in the valve cavity of the valve housing body and configured to rotate relative to the valve housing body about a valve axis. The valve rotor may cooperate with the valve housing to define a plurality of flow paths when the valve rotor is rotated about the valve axis to a plurality of different predetermined positions to control a flow of fluid through the valve housing. In some embodiments, the valve flow controller may further include an actuator coupled to the valve rotor to drive rotation of the valve rotor about the valve axis.

In some embodiments, the multi-way valve further includes a flow regulator. The flow regulator may be arranged on the valve rotor. The flow regulator configured to control a flow rate of fluid entering one flow path of the plurality of flow paths through the multi-way valve when the valve rotor is rotated from one position included in the plurality of different predetermined positions to another position included in the plurality of different predetermined positions so that the flow rate through the one flow path is increased while lowering the pressure in the multi-way valve.

In some embodiments, the valve rotor may be shaped to include a weir shell that extends around at least two apertures included in the plurality of apertures when the valve rotor is in each of the plurality of different predetermined positions. The weir shell may provide the flow regulator for controlling flow rate of fluid entering one of the plurality of flow paths through the multi-way valve. The weir shell may be configured to control a flow rate of fluid entering one flow path of the plurality of flow paths through the multi-way valve when the valve rotor is rotated from one position included in the plurality of different predetermined positions to another position included in the plurality of different predetermined positions so that the flow rate through the one flow path is increased while lowering the pressure in the multi-way valve.

In some embodiments, the weir shell may include a shell body wall that defines a main cavity and shell end walls that each defined an end cavity in fluid communication with the main cavity. Each shell end wall may be shaped to control flow from the main cavity to the end cavity in accordance with a preselected flow area curve.

In some embodiments, each shell end wall may have a first section and a second section that extend from the shell body wall and converge at an intersection point. An intersection angle may be defined between the first section and the second section. In some embodiments, the intersection angle is less than 90 degrees.

In some embodiments, each shell end wall may extend from the valve disc rotor plate to the shell body wall at a weir angle relative to the valve disc rotor plate. In some embodiments, the weir angle is less than 90 degrees.

In some embodiments, the valve rotor may include a valve rotor body and a valve rotor shaft that extends axially relative to the valve axis. The valve rotor body may include a valve rotor disc plate that extends circumferentially about the valve axis and the weir shell. In some embodiments, the valve rotor disc plate may be shaped to include a through hole spaced apart from the weir shell that extends axially through the valve rotor disc and circumferentially partway about the axis.

In some embodiments, the plurality of apertures formed in the valve housing includes at least four apertures. In some embodiments, the plurality of apertures formed in the valve housing includes at least five apertures. In some embodiments, the plurality of apertures formed in the valve housing includes at least six apertures.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 is a perspective diagrammatic view of a multi-way valve configured to control the flow of fluid to various thermal fluid circuits in a vehicle;

FIG. 2 is an exploded view of the multi-way valve of FIG. 1 showing the multi-way valve includes a valve housing, a valve flow controller, and a flow regulator, the valve housing including a lower valve housing having a plurality of apertures and an upper valve that cooperates with the lower valve housing to define a valve cavity in fluid communication with the plurality of apertures, the valve flow controller including a valve rotor configured to be arranged in the valve cavity and an actuator coupled to the valve rotor to drive rotation of the valve rotor about a valve axis to form a plurality of flow paths through the valve housing as suggested in FIGS. 7A-11B, and the flow regulator configured to control flow rate of fluid entering one of the plurality of flow paths through the multi-way valve when the valve rotor is rotated from one position included in the plurality of different predetermined positions to another position included in the plurality of different predetermined positions;

FIG. 3 is a perspective view of the valve rotor included in the multi-way valve of FIG. 2 showing the valve rotor includes a valve rotor body and a valve rotor shaft that extends axially relative to the valve axis, the valve rotor body including a valve rotor disc plate that extends circumferentially about the valve axis and a weir shell configured to extend around at least two apertures included in the plurality of apertures that open into the valve cavity to provide the regulating means for controlling flow rate of fluid entering one of the plurality of flow paths through the multi-way valve;

FIG. 4A is a top view of the valve rotor of FIG. 3 showing the valve rotor disc plate includes a through hole opposite the weir shell, and further showing the weir shell includes a shell body wall that extends circumferentially partway about the axis to define a main cavity and two shell end walls that each define an end cavity in fluid communication with the main cavity, and further showing the two shell end walls are shaped to control flow from the main cavity to the end cavity in accordance with a preselected flow area curve as shown in FIG. 6A;

Figures 1, 2:
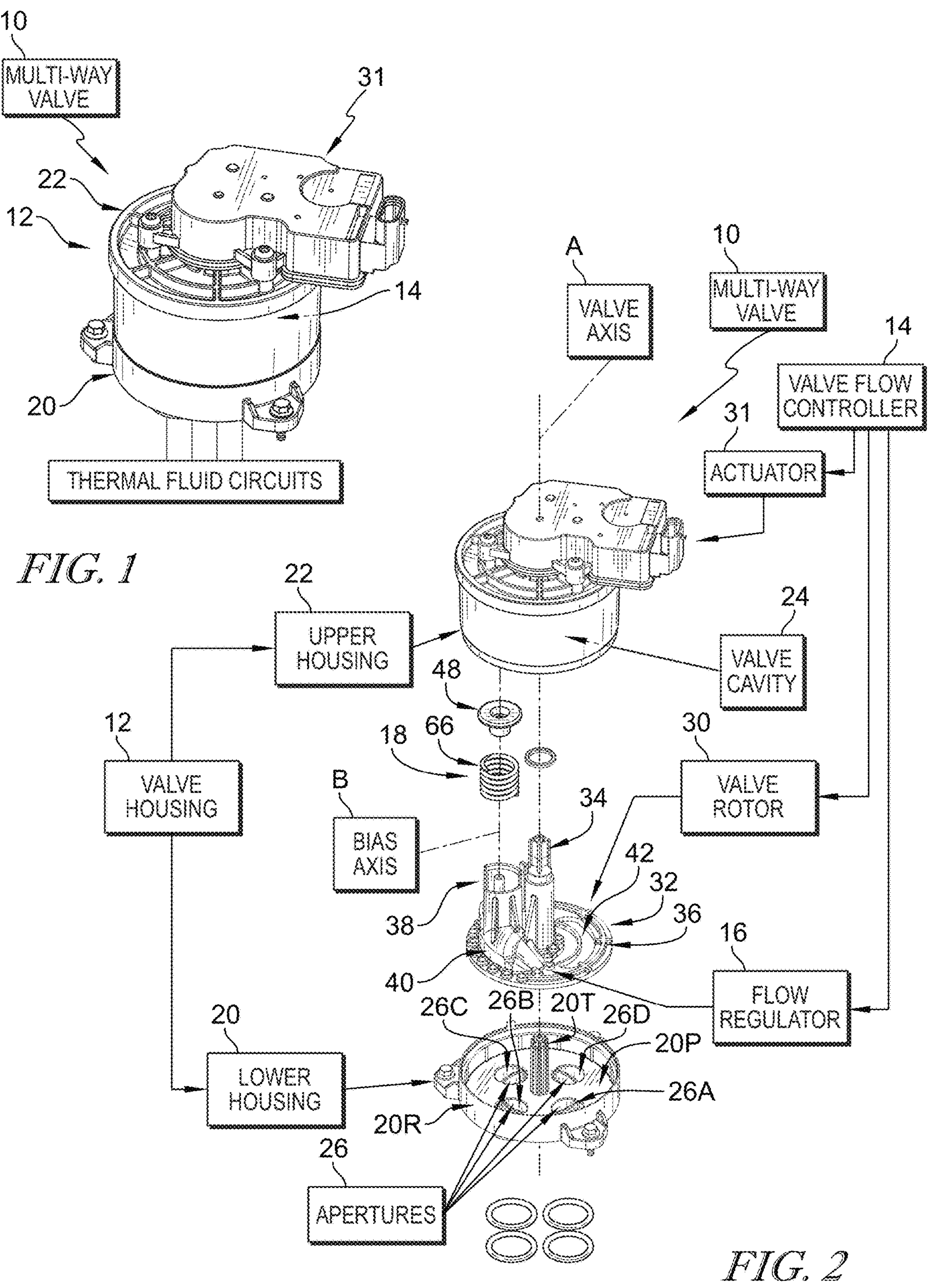
Figure 6A:
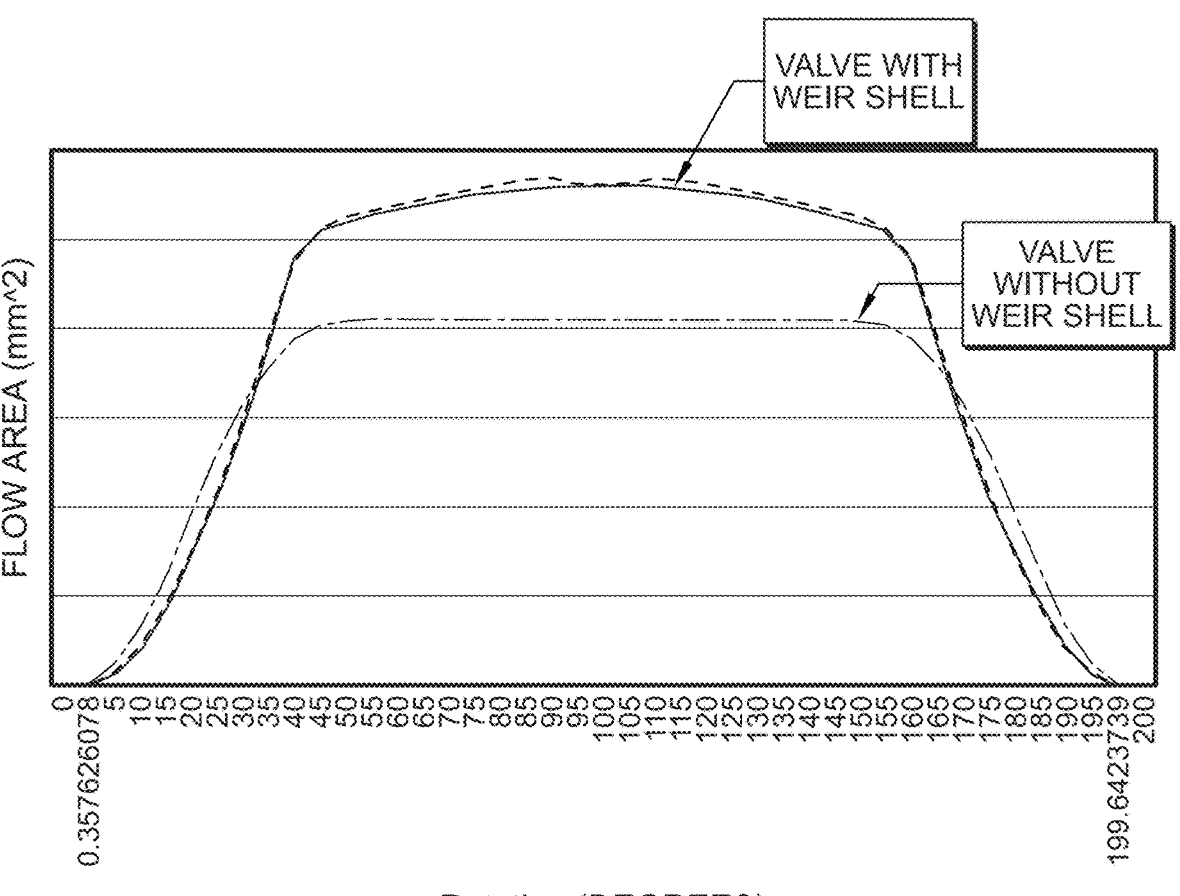
Figure 6B:
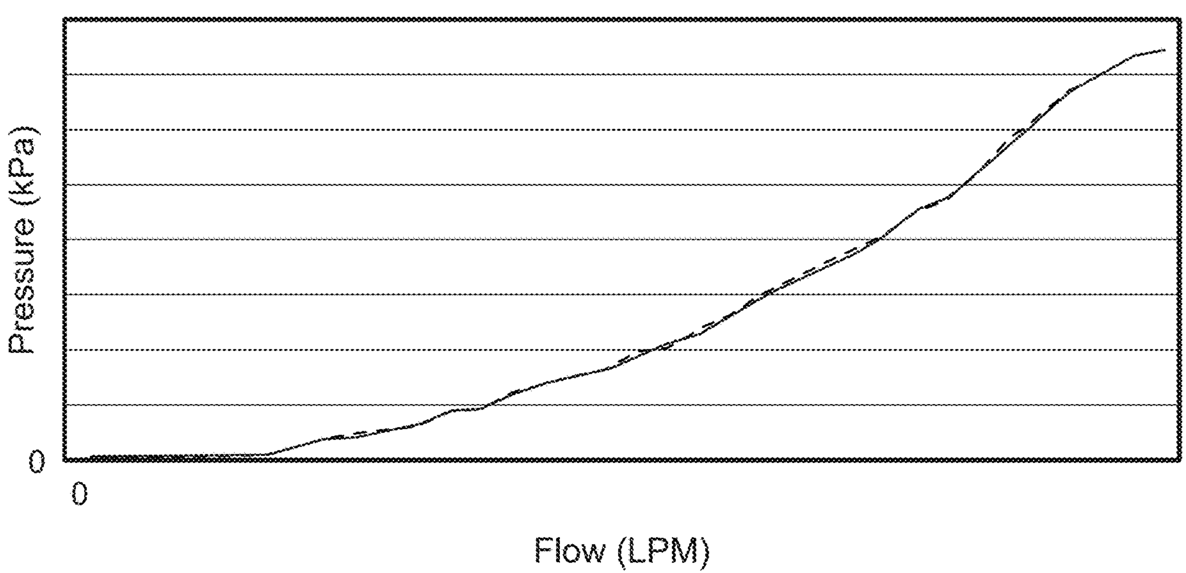
Figure 7A:
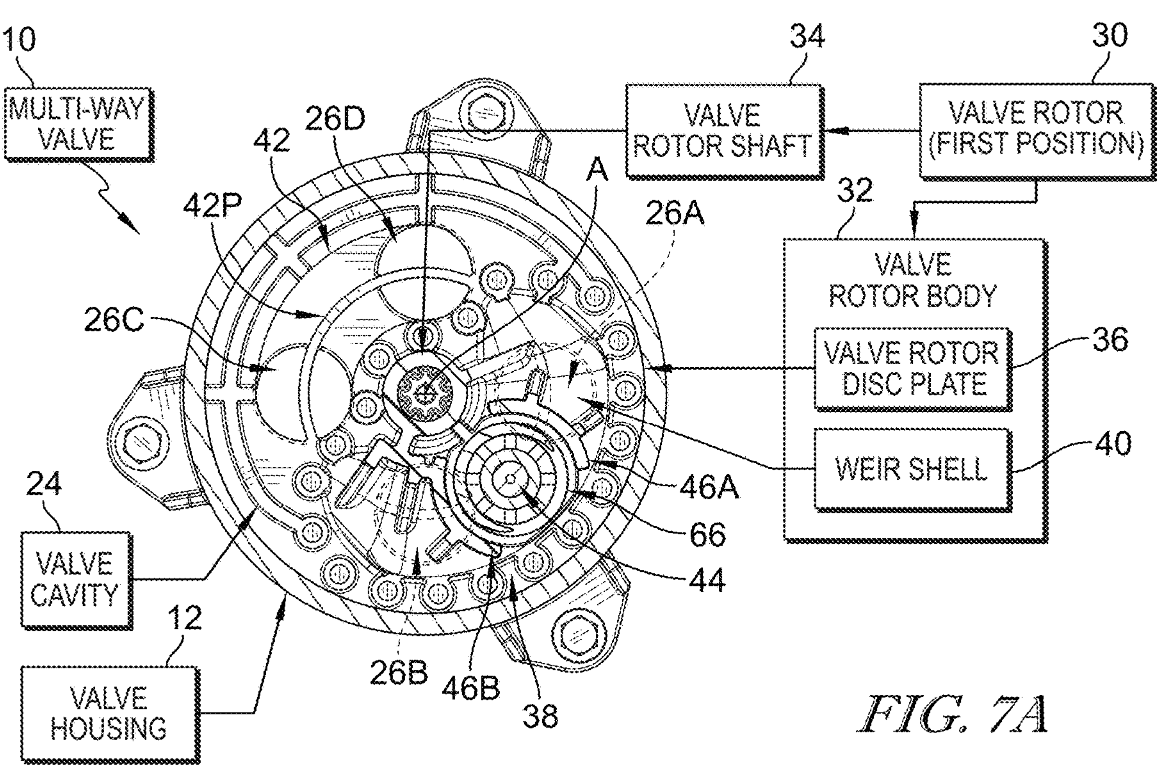
Figure 7B:
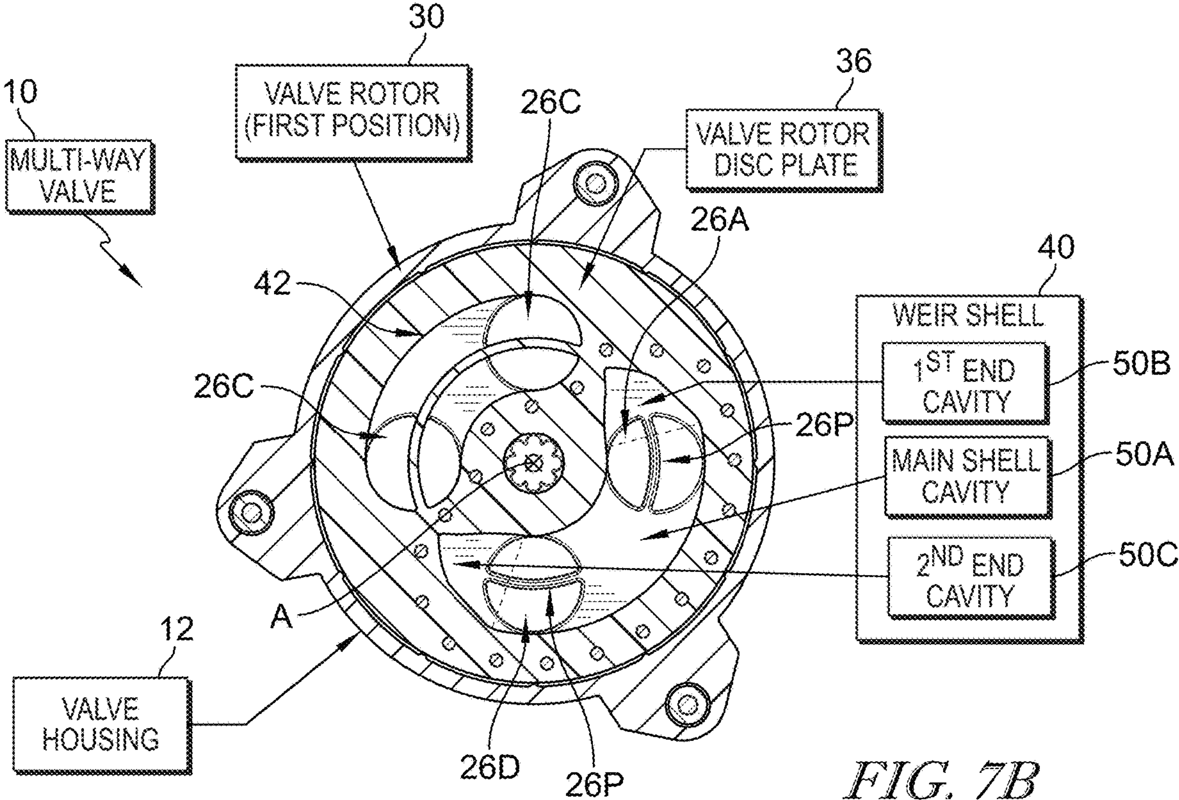
Figure 8A:
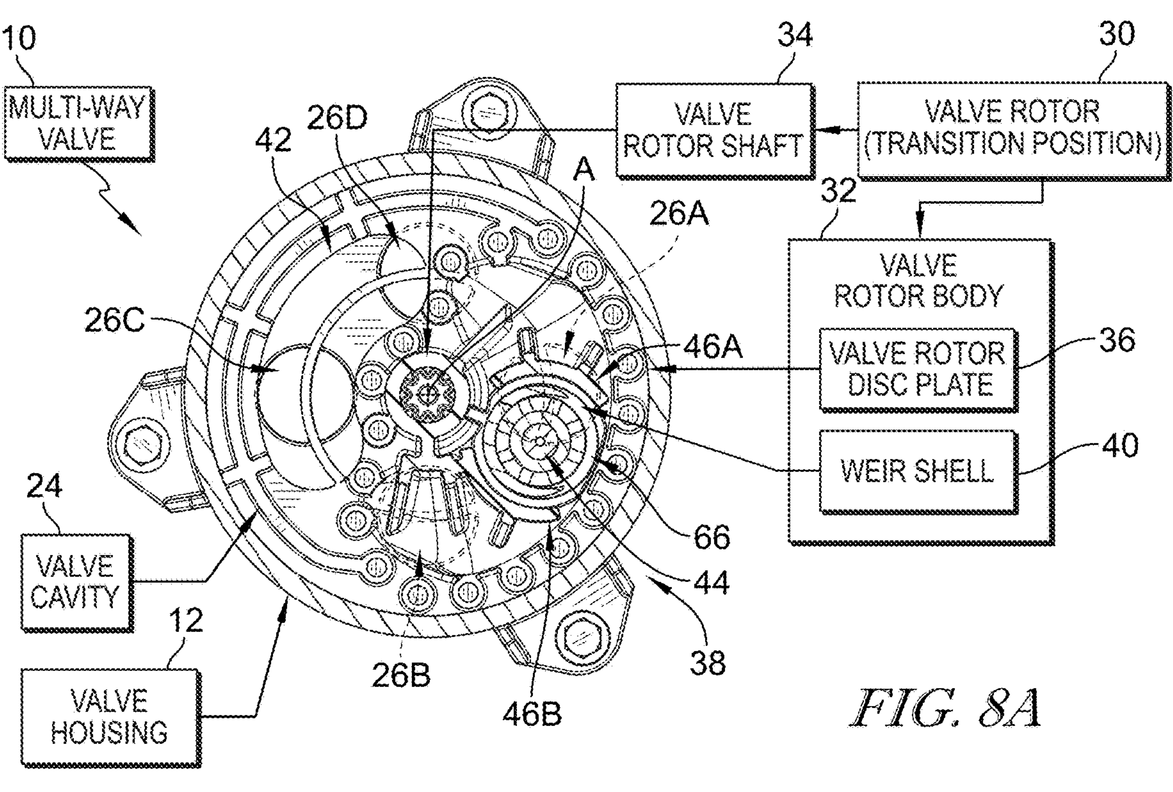
Figure 8B:
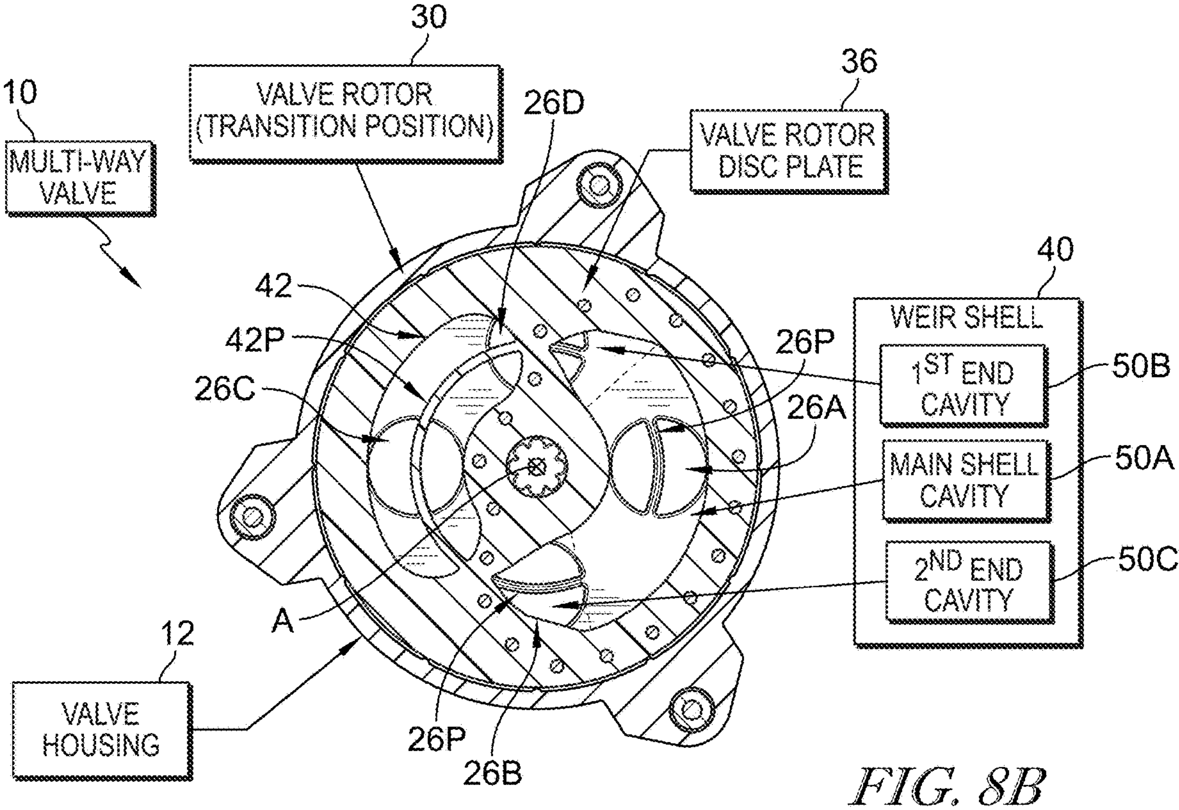
Figure 9A:
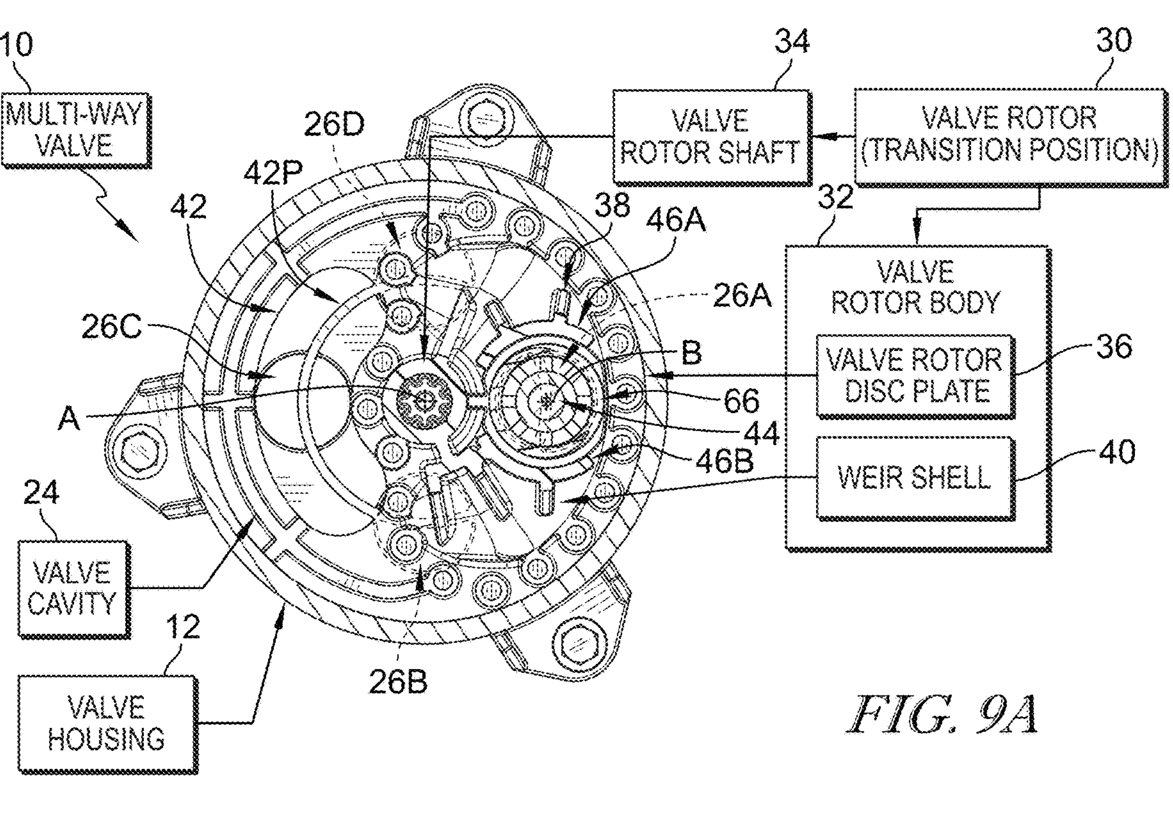
Figure 9B:
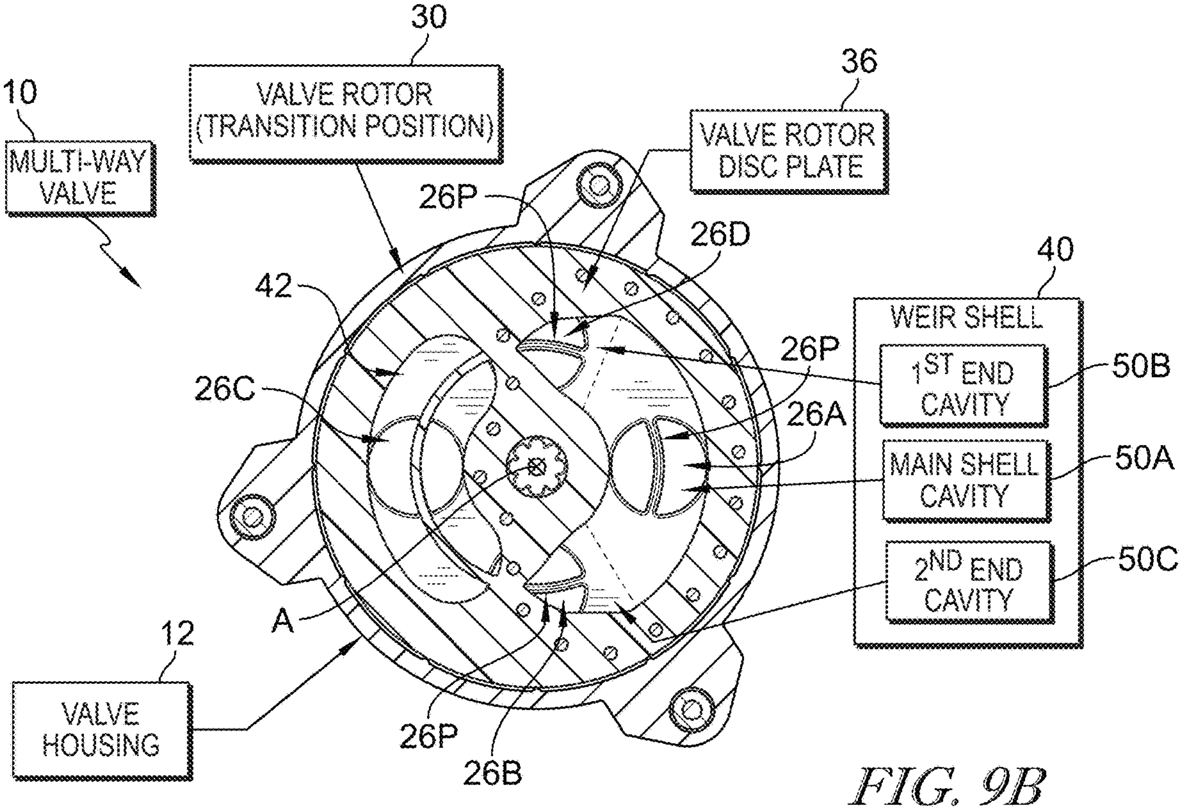
Figure 10A:
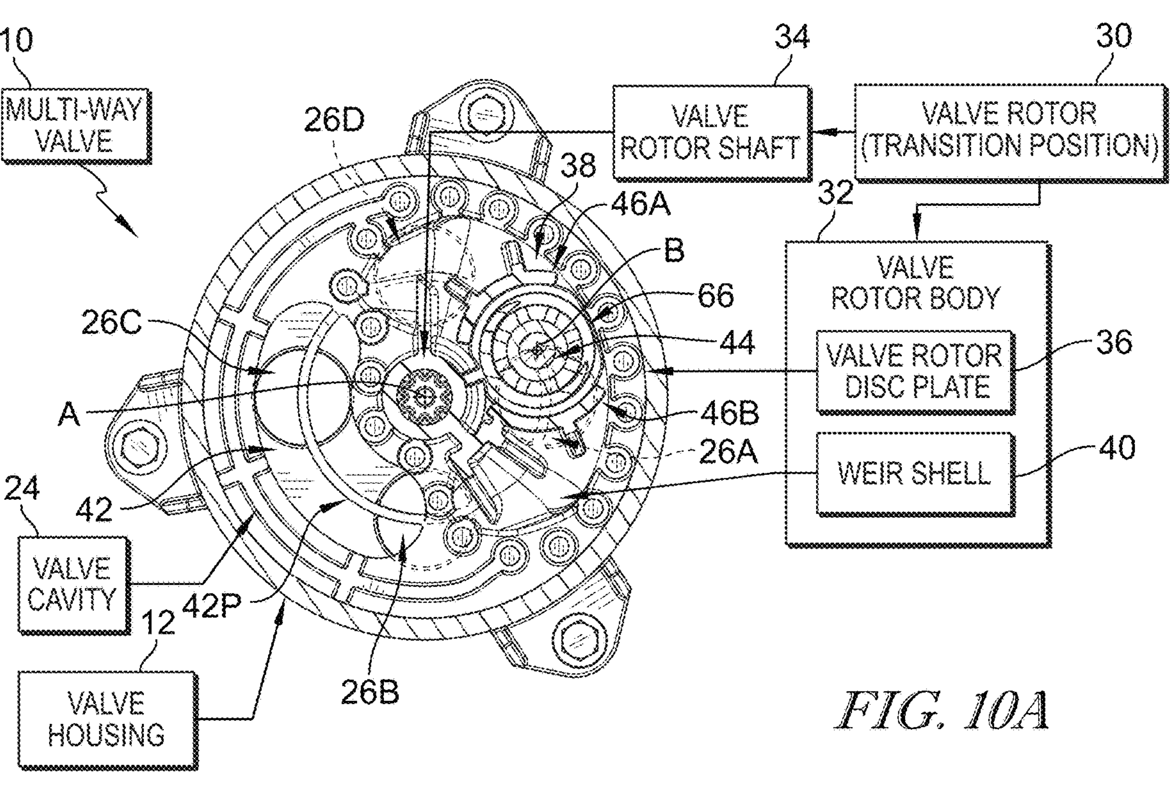
Figure 10B:
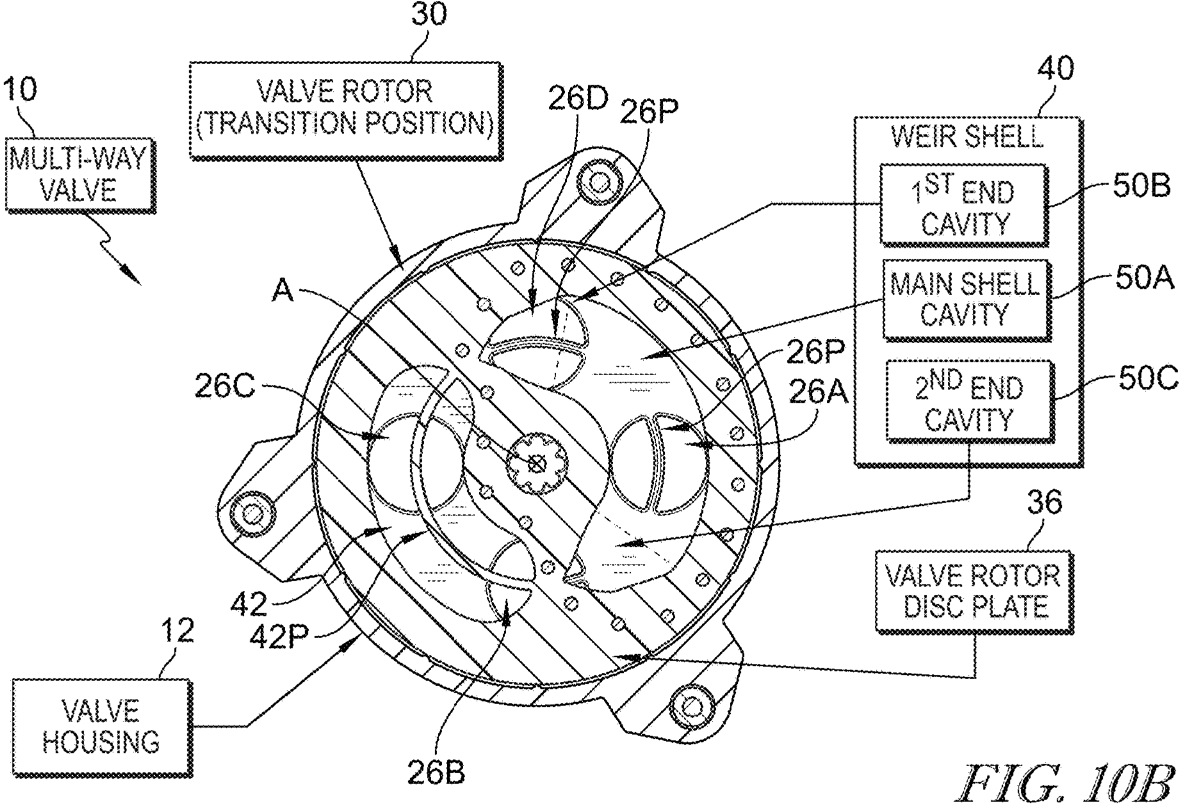
Figure 11A:
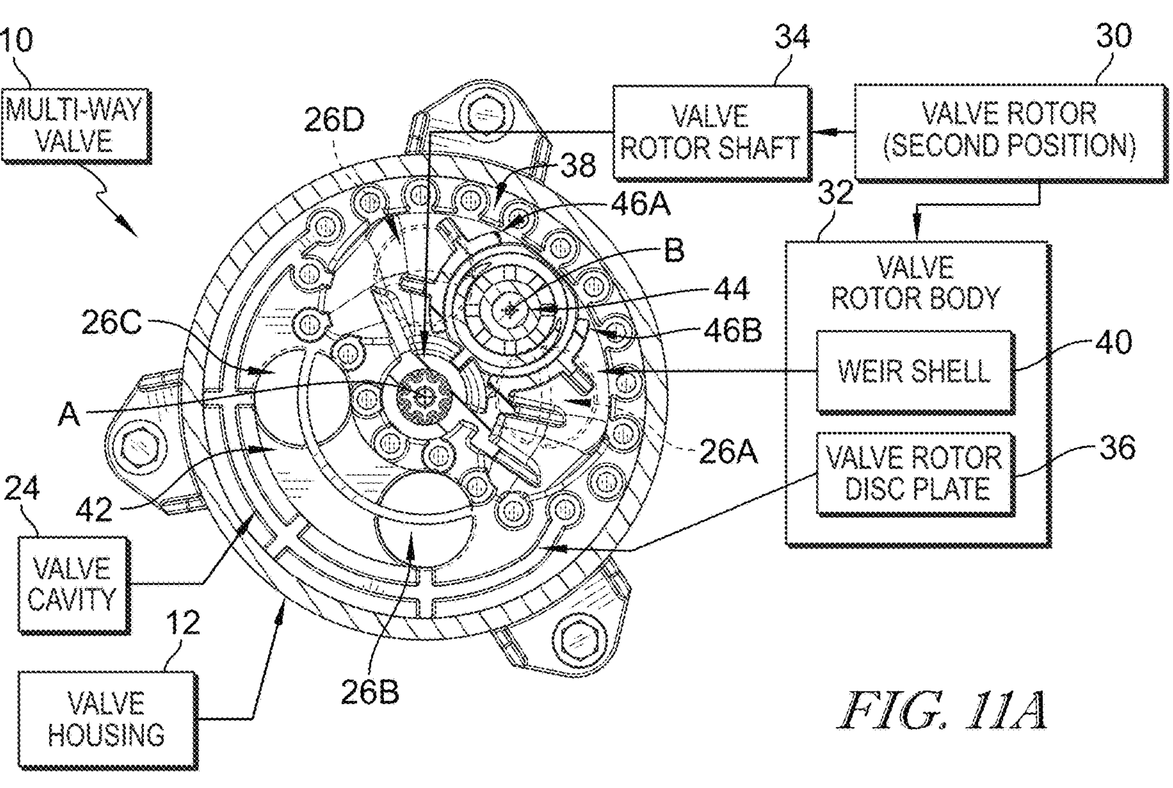
Figure 11B:
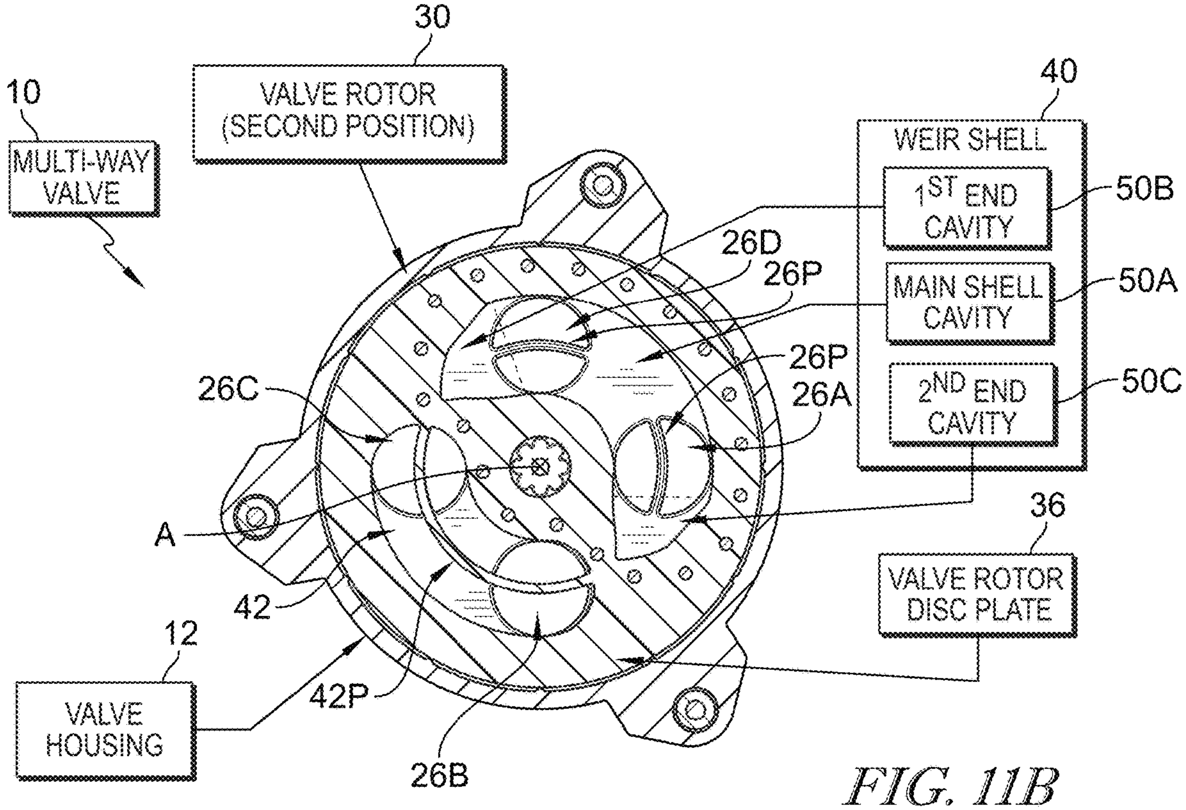

FIG. 6A is a graph showing the preselected flow area curve having a ramp up section as the valve rotor begins to rotate about the axis from the first position to the second position in which the flow area through one of the apertures is increased, a maximum flow section at which the valve rotor has rotated to the second position and the flow area through one of the apertures is fully open, and a ramp down section as the valve rotor beings to rotate about the axis to the next position, and further showing as the weir formed on each shell end wall engages/disengages the associated aperture, the exponential curve of the ramp up/down sections controls the total flow in/out of the weir shell and may be tuned based on the desired capabilities of the valve;

FIG. 6B is a graph showing the flow residence in the multi-way valve as the valve rotor rotates from one position to next position;

FIG. 7A is a top side view of the multi-way valve of FIG. 1 showing the valve rotor is in a first position to define a first flow path;

FIG. 7B is a view similar to FIG. 7A showing the weir shell extends completely around a first aperture and a second aperture in the valve housing to define a first flow path when the valve rotor is in the first position;

FIG. 8A is a top side view of the multi-way valve of FIG. 1 showing the valve rotor has begun rotating from the first position to a second position as shown in FIGS. 11A and 11B;

FIG. 8B is a view similar to FIG. 8A showing the first shell end wall of the weir shell has begun to move over a third aperture to allow an initial flow through the third aperture while the second shell end wall of the weir shell has begun to move away from the first aperture to being to limit flow through the first aperture;

FIG. 9A is a top side view of the multi-way valve of FIG. 1 showing the valve rotor continues to rotate toward the second position;

FIG. 9B is a view similar to FIG. 9A showing the first shell end wall of the weir shell has continued to move over the third aperture to increase flow through the third aperture while the second shell end wall of the weir shell has continued to move away from the first aperture to further limit flow through the first aperture;

FIG. 10A is a top side view of the multi-way valve of FIG. 1 showing the valve rotor continues to rotate toward the second position;

FIG. 10B is a view similar to FIG. 9A showing the first shell end wall of the weir shell has continued to move over the third aperture to further increase flow through the third aperture while the second shell end wall of the weir shell has continued to move away from the first aperture to further limit flow through the first aperture;

FIG. 11A is a top side view of the multi-way valve of FIG. 1 showing the valve rotor is in the second position to define a second flow path; and FIG. 11B is a view similar to FIG. 9A showing the weir shell extends completely around the second aperture and the third aperture in the valve housing to define the second flow path when the valve rotor is in the second position.

DETAILED DESCRIPTION

An illustrative multi-way valve is shown in FIG. 1. The multi-way valve 10 includes a valve housing 12 and a valve flow controller 14 as shown in FIGS. 2-4B. The valve housing 12 is shaped to include a valve cavity 24 and a plurality of apertures 26, illustratively four apertures 26A-D, that open into the valve cavity 24. The valve flow controller 14 is arranged in the valve cavity 24 of the valve housing 12 to control flow through a plurality of flow paths formed by the valve housing 12 and the valve flow controller 14.

The valve flow controller 14 includes a valve rotor 30 arranged in the valve cavity 24 of the valve housing 12 and an actuator 31 as shown in FIGS. 2-4B. The valve rotor 30 is configured to rotate relative to the valve housing 12 about a valve axis A. The actuator 31 is coupled to the valve rotor 30 to drive rotation of the valve rotor 30 about the valve axis A. The valve rotor 30 cooperates with the valve housing 12 to define the plurality of flow paths when the valve rotor 30 is rotated about the valve axis A to a plurality of different predetermined positions to control a flow of fluid through the valve housing 12.

The multi-way valve 10 further includes regulating means for controlling a flow rate of fluid entering one flow path of the plurality of flow paths through the multi-way valve 10 when the valve rotor 30 is rotated from one position included in the plurality of different predetermined positions to another position included in the plurality of different predetermined positions so that the flow rate through the one flow path is increased while lowering the pressure in the multi-way valve 10. The regulating means or flow regulator 16 is provided by a weir shell 40 included in the valve rotor 30. The weir shell 40 extends around at least two apertures 26A-D formed in the valve housing 12 to separate the flow of fluid through the two apertures 26A-D from the valve cavity 24. The shell end walls 54, 56 of the weir shell 40 are shaped to control flow through the apertures 26A-D as the valve rotor 30 rotates from one position to the next.

Other multi-way valves may have a valve rotor that rotates to control flow through different apertures. However, as the valve rotor rotates there is a sudden flow rate and pressure change as the valve rotor connects different apertures to form different flow paths. The sudden flow rate and pressure change, also known as "burping" may affect the performance of the valve.

Therefore, the multi-way valve 10 of the present disclosure includes the regulating means for controlling the flow rate of fluid entering one flow path of the plurality of flow paths through the multi-way valve when the valve rotor is rotated between the different positions. The shell end walls 54, 56 of the weir shell 40 on the valve rotor 30 are shaped to allow some initial flow through the associated aperture 26A-D as the valve rotor 30 begins to rotate and continue to increase the flow area of the associated aperture 26A-D as the valve rotor 30 continues to rotate until the valve rotor 30 reaches the next position. This allows for better flow control between the different modes.

The flow area curves of the multi-way valve 10 with the weir shell 40 and a multi-way valve without a weir shell is shown in FIG. 6A. The preselected flow area curve, i.e. the flow curve of the multi-way valve 10 with the weir shell 40, shows the flow area through the weir shell 40 as the valve 10 rotates from one position to the next position. The flow regulator 16 allows the ramp up/down sections of the curve to be substantially linear with a steep or large slope. The desired flow rate or pressure for the multi-way valve 10 may be determined and the shape of the shell end walls 54, 56 optimized to achieve the preselected flow area curve. The flow regulator 16 controls the pressure balance within the system, thereby increasing the flow control and reducing inverse affects to the actuator 31. The ramp up/down also allows for control and rebalance the system based on the needs to the system. If a less expensive actuator is used, the flow regulator 16 may make up the difference in terms or controlling flow during rotation of the valve rotor 30.

The valve rotor 30 includes a valve rotor body 32 and a valve rotor shaft 34 as shown in FIGS. 2-4A. The valve rotor body 32 extends circumferentially about the valve axis A. The valve rotor shaft 34 extends axially from the valve rotor body 32 relative to the valve axis A.

The valve rotor body 32 includes a valve rotor disc plate 36 and the weir shell 40 as shown in FIGS. 2-11B. The valve rotor disc plate 36 extends circumferentially about the valve axis A. The weir shell 40 extends from the valve rotor disc plate 36 to create a cavity 50 that extends around at least two apertures 26A-D included in the plurality of apertures 26A-D that open into the valve cavity 24 when the valve rotor 30 is in each of the plurality of different predetermined positions.

Figure 3:
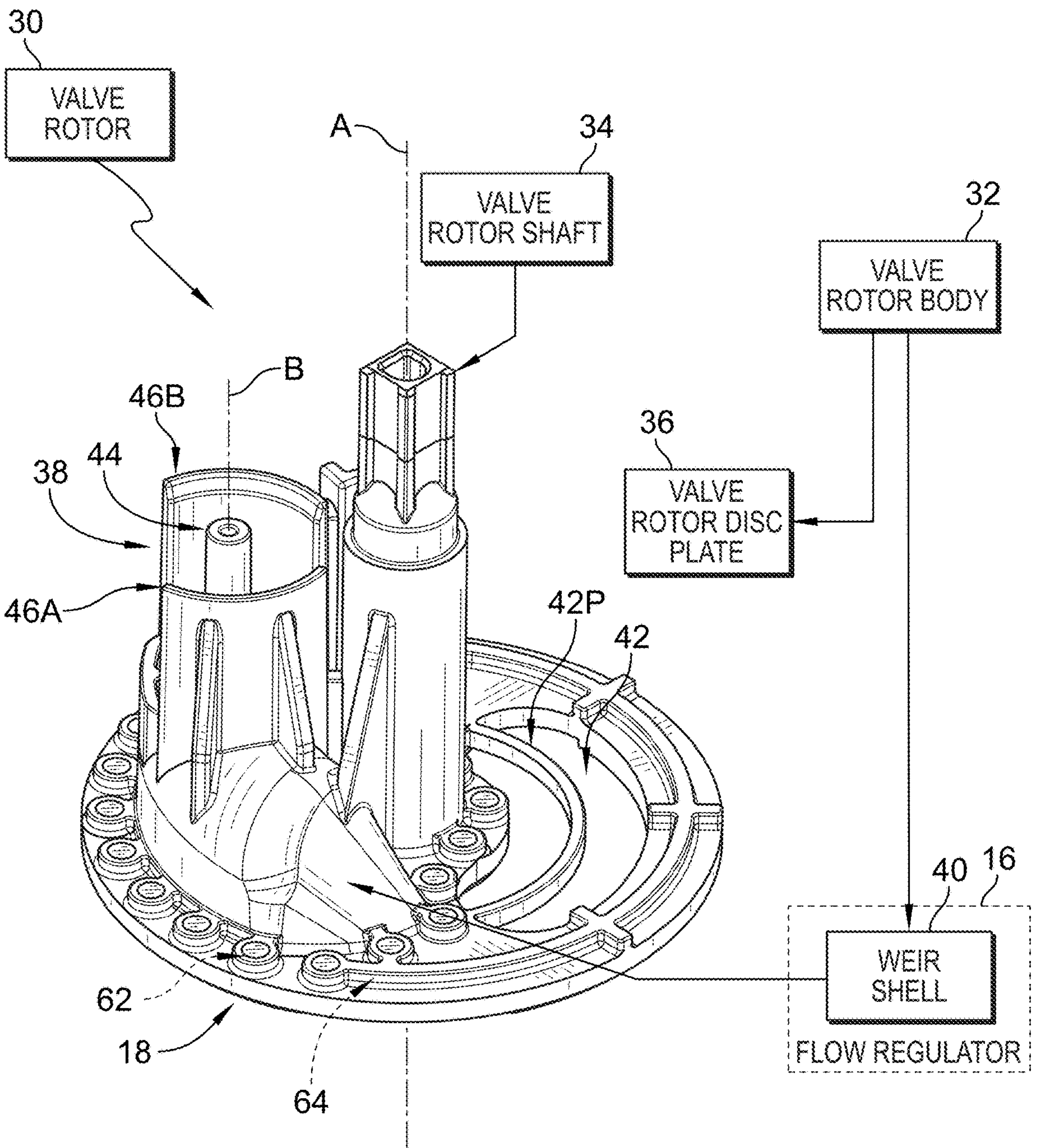
Figures 4A, 4B:
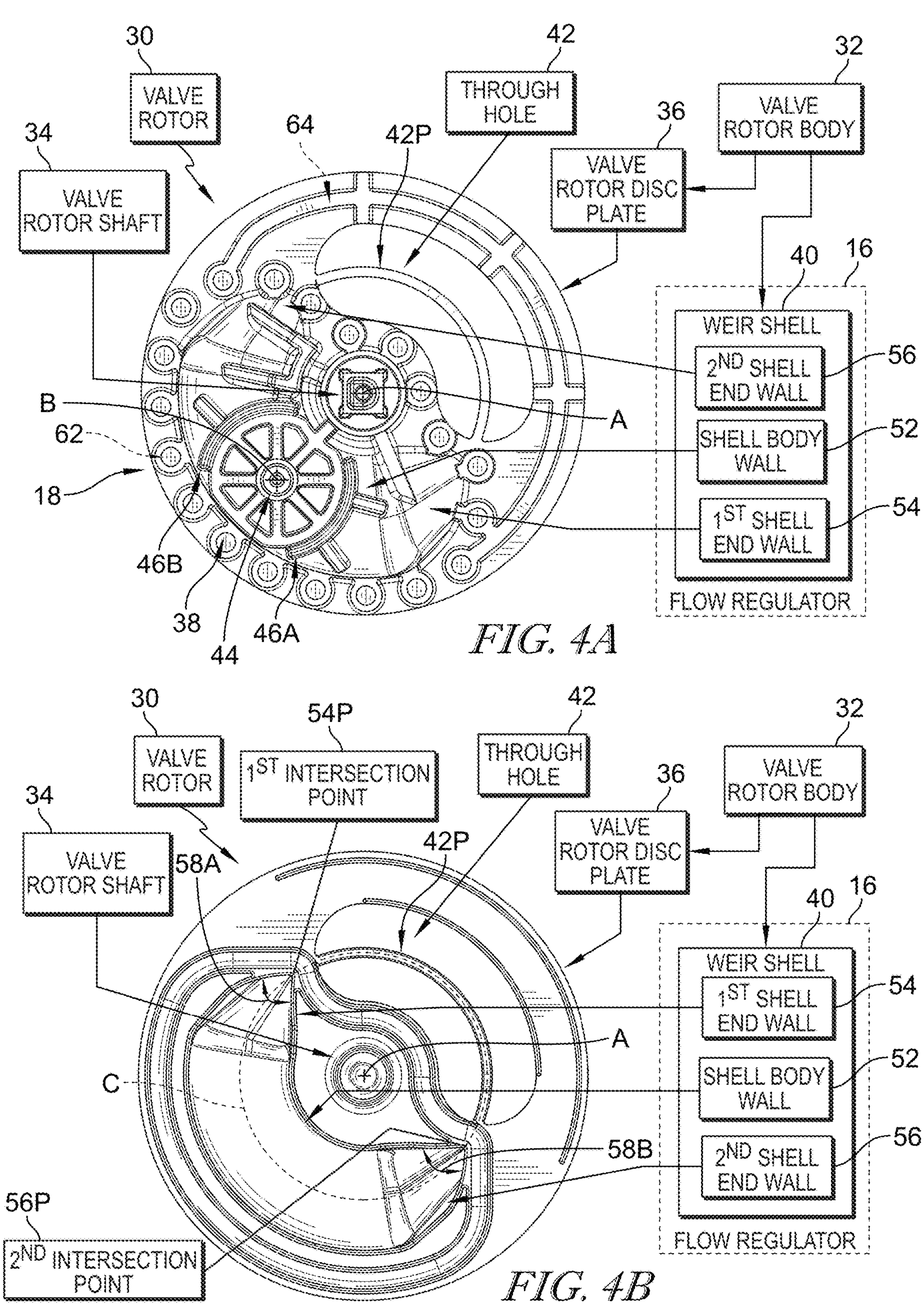
FIG. 4B is a bottom view of the valve rotor of FIG. 3 showing each of the shell end walls has a first section and a second section that extend from the shell body wall and converge at an intersection point.

The valve rotor disc plate 36 is formed to include at least one a through hole 42 opposite the weir shell as shown FIGS. 3-4B. The through hole 42 aligns with the other two apertures 26A-D included in the plurality of apertures 26A-D that open into the valve cavity 24 when the valve rotor 30 is in each of the plurality of different predetermined positions. In this way, the fluid may flow between the adjacent apertures 26A-D by flowing through the valve cavity 24.

The through hole 42 extends circumferentially partway about the valve axis A as shown in FIGS. 2-11B. In the illustrative embodiment, the through hole 42 has a partition 42P as shown in FIGS. 2-11B. The partition 42P extends across the through hole 42 and divides the through hole 42 into sections. In some embodiments, the partition 42P is omitted. In some embodiments, the valve rotor disc plate 36 may include separate through holes 42A, 42B that align with the respective adjacent apertures 26A-D in the valve housing 12 when the valve rotor 30 is in each of the plurality of different predetermined positions.

The weir shell 40 is configured to extend around at least two apertures 26A-D included in the plurality of apertures 26A-D that open into the valve cavity 24 when the valve rotor 30 is in each of the plurality of different predetermined positions. In this way, the fluid may flow between the adjacent apertures 26A-D by flowing through the cavity 50 defined by the weir shell 40. The weir shell 40 provides the regulating means for controlling flow rate of fluid entering one of the plurality of flow paths through the multi-way valve 10.

The weir shell 40 includes a shell body wall 52, a first shell end wall 54, and a second shell end wall 56 as shown in FIGS. 3-11B. The shell body wall 52 defines a main cavity section 50A and shell end walls 54, 56 each define an end cavity section 50B, 50C in fluid communication with the main cavity section 50A. The main cavity 50A, the first end cavity 50B, and the second end cavity 50C define the cavity 50. Each shell end wall 54, 56 is shaped to control flow from the main cavity 50A to the end cavity 50B, 50C in accordance with a preselected flow area curve.

Figure 5:
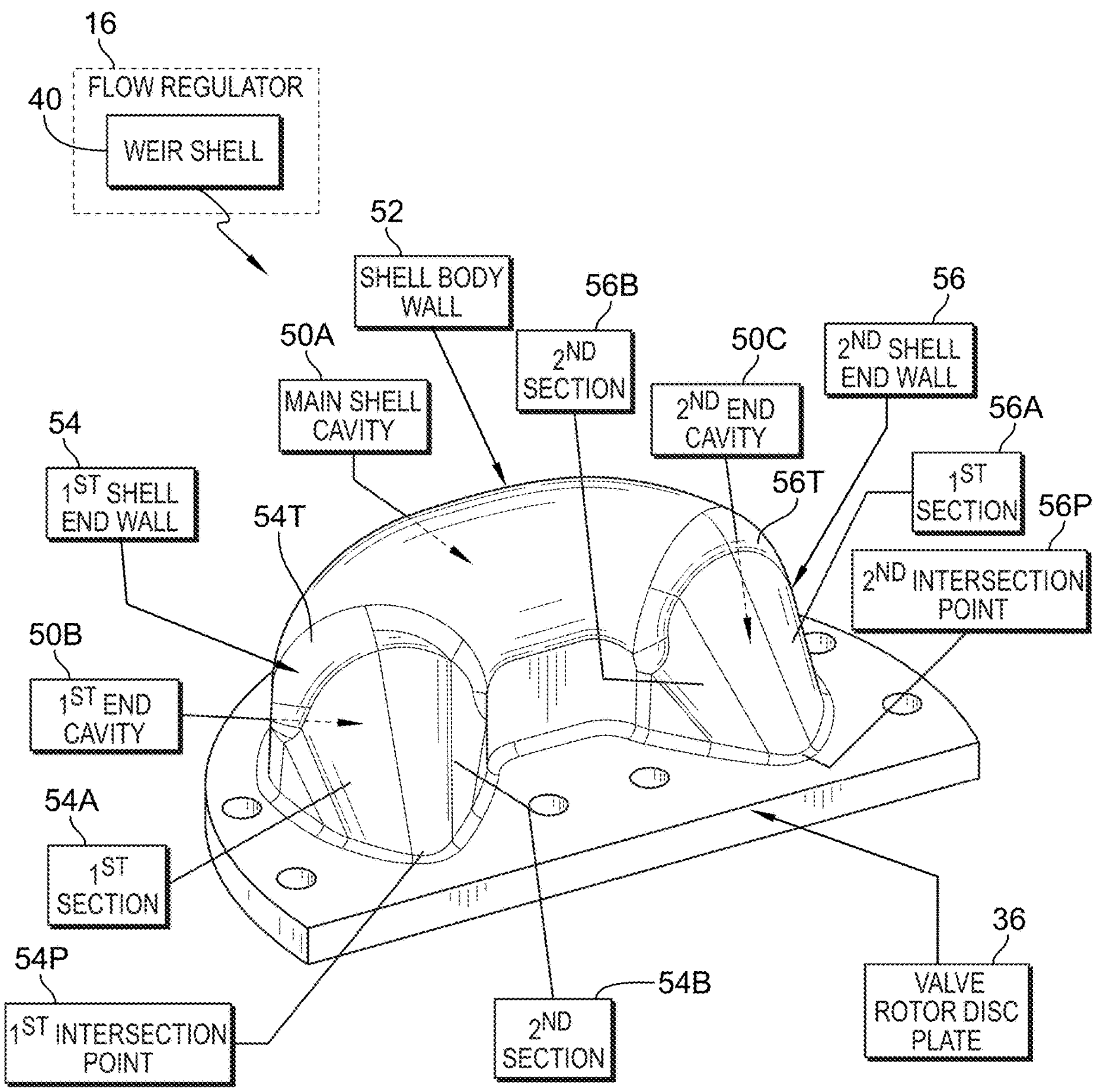
FIG. 5 is a perspective view of the weir shell included in the valve rotor of FIG. 3 which forms the flow regulator.

In the illustrative embodiment, the weir shell 40 further include transition sections 54T, 56T that extend between and interconnect the shell body wall 52 and each shell end wall 54, 56 as shown in FIG. 5. The transition sections 54T, 56T create a smooth transition between the shape of the shell body wall 52 and the angled shell end walls 54, 56 instead of a sharper edge or transition. As shown in FIG. 5B, the transition sections 54T, 56T form a fillet or smooth transition rather than a sharp angle between the sections of the weir shell 40. The radius or curvature of the transition sections 54T, 56T may be adjusted.

Figure 5A:
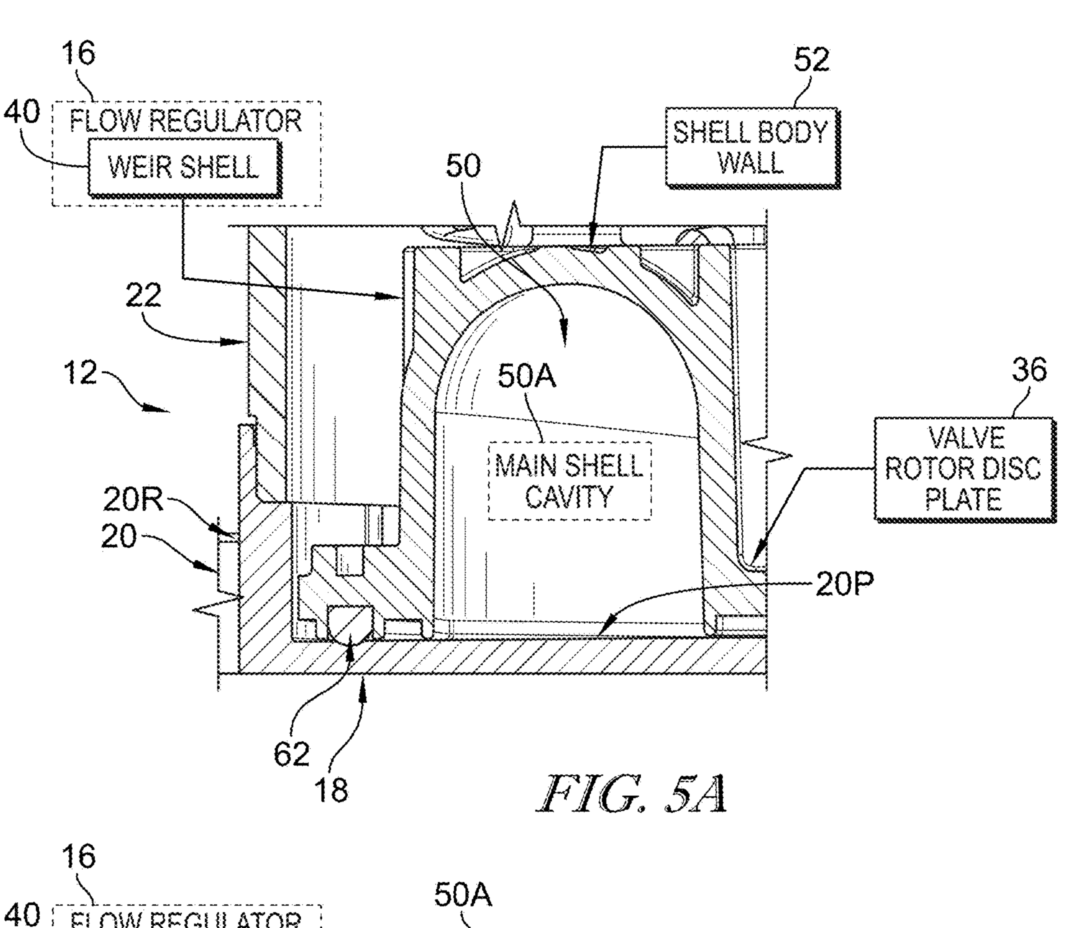
FIG. 5A is a cross-section view of the weir shell of FIG. 5 showing the shell body wall has vertical wall sections and a curved top section that extends between the vertical wall sections to define the shape of the main cavity.
Figure 5B:
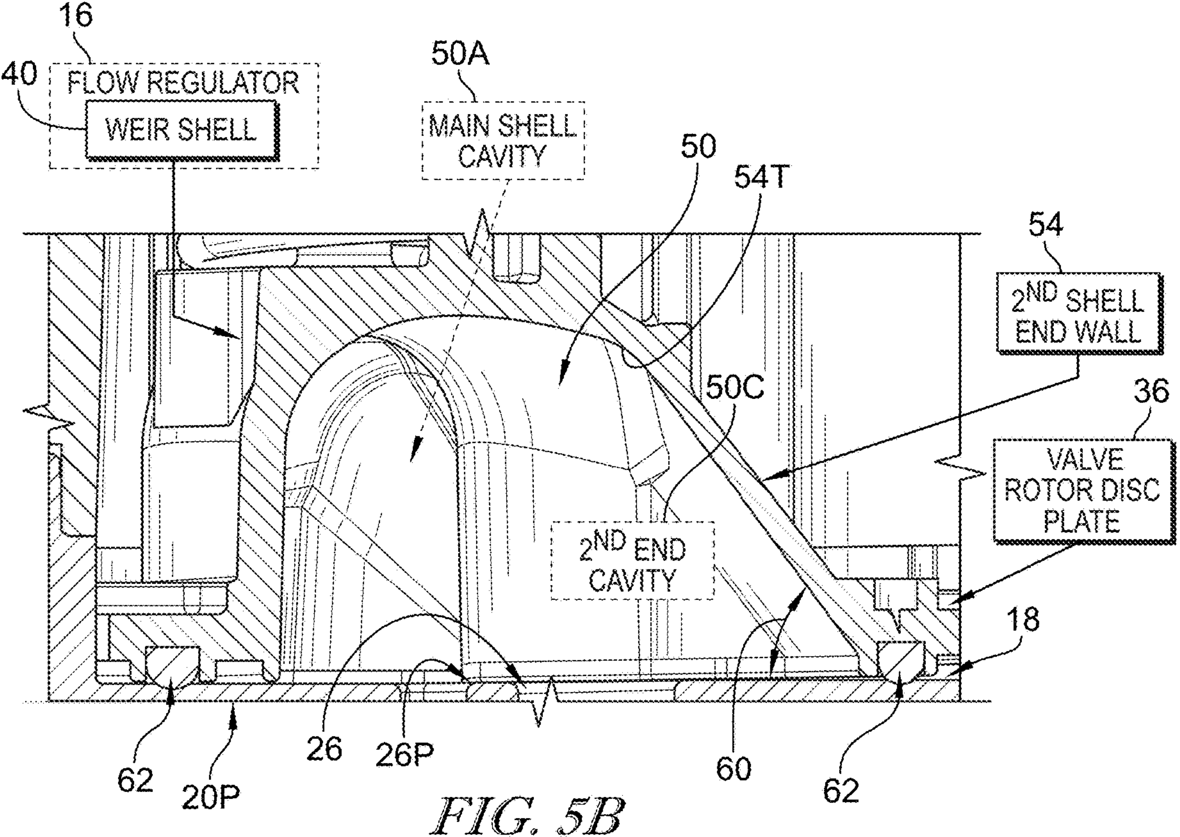
FIG. 5B is a cross-section view of the weir shell of FIG. 5 showing the shell end wall has an angled section that extends from the valve disc rotor plate to the shell body wall at a weir angle relative to the valve disc rotor plate.

The shell body wall 52 has a U-shape as shown in FIG. 5A. The U-shape of the shell body wall 52 is constant as the shell body wall 52 extend circumferentially about the valve axis A between the first and second shell end walls 54, 56. As such, the area of the main shell cavity 50A is constant, while the area of the first and second end cavities 50B, 50C varies as shown in FIGS. 4B and 5B.

Each shell end wall 54, 56 has a first section 54A, 56A and a second section 54B, 56B as shown in FIGS. 3-11B. The first and second sections 54A, 54B, 56A, 56B extend from the shell body wall 52 and converge at an intersection point 54P, 56P. The first and second sections 54A, 54B, 56A, 56B taper inwardly to form a V-shape and converge at the intersection point 54P, 56P. As such, the area of the respective end cavity 50B, 50C increases as the shell end wall 54, 56 extends from the intersection point 54P, 56P toward shell body wall 52. As shown in FIG. 4B, an intersection angle 58A, 58B is formed between the first and second sections 54A, 54B, 56A, 56B.

The shape of the intersection points 54P, 56P may be adjusted to increase or decrease the flow rate based on the desired flow rate and/or pressure. The intersection points 54P, 56P may be rounded to decrease the flow rate and may be made sharper to increase the flow rate. In the illustrative embodiment, the intersection angle 58A, 58B of the wall sections 54A, 54B, 56A, 56B is less than about 90 degrees. The intersection angle 58A, 58B of the wall sections 54A, 54B, 56A, 56B may be adjusted to alter the shape of the intersection points 54P, 56P as well.

As shown in FIG. 4B, the shell body wall 52 extends circumferentially at least partway about the valve axis A as suggested by dotted circumferential line C. Each shell end wall 54, 56 extends from the shell body wall 52, but tapers inwardly to the intersection points 54P, 56P which are aligned with the circumferential line C as shown in FIG. 4B. In other embodiments, the intersection points 54P, 56P of each shell end wall 54, 56 may instead be offset or not aligned with the circumferential line C.

In the illustrative embodiment, the second section 54B, 56B of the respective shell end walls 54, 56 is longer than the first section 54A, 56A as shown in FIGS. 4B-11B. Each section 54A, 54B, 56A, 56B of the respective shell end walls 54, 56 has a freeform shape that includes multiple curves like as shown in FIG. 3. The shape of the shell end walls 54, 56 may be adjusted to control the flow rate and pressure.

Each shell end wall 54, 56 extends from the valve rotor disc plate 36 to the shell body wall 52 at a weir angle 60 relative to the valve rotor disc plate 36 as shown in FIG. 4B. The weir angle 60 is defined between the lower housing body 20 and the respective shell end wall 54, 56. In the illustrative embodiment, the weir angle 60 is less than about 90 degrees. The weir angle 60 may also be adjusted instead of or in combination with the shape of the intersection point 54P, 56P to control the flow rate and pressure.

The operation of the multi-way valve 10 is shown in FIGS. 7A-11B. The valve rotor 30 rotates between different predetermined positions to form the different flow paths through the valve housing 12. As shown in FIGS. 7A and 7B, the valve rotor is in a FIRST position to define a first flow path through the valve housing 12. In the FIRST position, the weir shell 40 extends around two adjacent apertures 26A, 26B in the valve housing 12 and the through hole 42 extends around the other adjacent apertures 26C, 26D as shown in FIGS. 7A and 7B.

To change the flow path, the valve rotor 30 rotates about the valve axis A from the FIRST position as shown in FIGS. 7A and 7B to a SECOND position as shown in FIGS. 11A and 11B. From the FIRST position to the SECOND position, the valve rotor 30 rotates about 90 degrees about the valve axis A. However, depending on the number of flow paths and thus the number of apertures 26A-D in the valve housing 12, the valve rotor 30 may rotate more or less than 90 degrees about the valve axis A when moving between the predetermined positions.

As the valve rotor 30 begins to rotate one of the shell end walls 54, 56 begins to move over and overlap an adjacent aperture 26D as shown in FIGS. 8A and 8B. In this transition position, the first shell end wall 54 of the weir shell 40 moves over and overlaps the adjacent aperture 26D such that the first end cavity 50B is in fluid communication with the aperture 26D to allow an initial flow through the aperture 26D as shown in FIGS. 8A and 8B. At the same time, the second shell end wall 56 of the weir shell 40 moves away from the aperture 26B to being to limit flow through the aperture 26B as shown in FIGS. 8A and 8B.

As the valve rotor 30 continues to rotate about the valve axis A to the SECOND position, the first shell end wall 54 of the weir shell 40 continues to move over the aperture 26D to increase flow through the aperture 26D as shown in FIGS. 9A and 9B. At the same time, the second shell end wall 56 of the weir shell 40 continues to move away from the aperture 26B to further limit flow through the aperture 26B as shown in FIGS. 9A and 9B. At this transition position shown in FIGS. 9A and 9B, the flow area through the aperture 26D is increased so that flow area through both apertures 26B, 26D is about equal.

As the valve rotor 30 continues to rotate about the valve axis A to the SECOND position, the first shell end wall 54 of the weir shell 40 continues to move over the aperture 26D to increase flow through the aperture 26D, while further restricting flow through the aperture 26B as shown in FIGS. 10A and 10B. The first shell end wall 54 of the weir shell 40 continues to move over and overlap the aperture 26D to further increase flow through the aperture 26D. At the same time, the second shell end wall 56 of the weir shell 40 continues to move away from the aperture 26B to further limit flow through the aperture 26B as shown in FIGS. 10A and 10B. At this transition position shown in FIGS. 10A and 10B, the flow area through the aperture 26D is greater than the flow area through the aperture 26B until the second shell end wall 56 no longer overlaps the aperture 26B.

As shown in FIGS. 11A and 11B, the valve rotor is in a SECOND position to define a second flow path through the valve housing 12. In the SECOND position, the weir shell 40 extends around two adjacent apertures 26A, 26D in the valve housing 12 and the through hole 42 extends around the other adjacent apertures 26B, 26C as shown in FIGS. 11A and 11B. To change the flow path again, the valve rotor 30 may be rotated in the same direction about the valve axis A to a THIRD position or may be rotated back to the FIRST position.

Turning again to the multi-way valve 10, the multi-way valve 10 includes the valve housing 12, the valve flow controller 14, the flow regulator 16, and a sealing system 18 as shown in FIGS. 1-11B. The valve housing 12 is shaped to include the valve cavity 24 that houses the valve rotor 30 of the valve flow controller 14. The valve flow controller 14 is arranged in the valve cavity 24 of the valve housing 12 to control flow through the plurality of flow paths formed by the valve housing 12 and the valve flow controller 14. The flow regulator 16 is configured to control flow rate of fluid entering one of the plurality of flow paths when the valve rotor 30 is rotated from one predetermined position to another predetermined position. The sealing system 18, including seal elements 62, 64 and a bias element 66, is arranged between the valve rotor 30 of the valve flow controller 14 and the valve housing 12 to seal between the valve housing 12 and the valve rotor 30 of the valve flow controller 14.

The valve housing 12 includes a lower housing body 20 and an upper housing body 22 as shown in FIGS. 1 and 2. The lower and upper housing bodies 20, 22 are coupled together and cooperate to define the valve cavity 24 in the illustrative embodiment. In other embodiments, the lower housing body 20 or the upper housing body 22 may define the valve cavity 24 and the other is a cover that couples to the lower housing body 20 or the upper housing body 22 to close an opening to the valve cavity 24. The lower housing body 20 is formed to define the plurality of apertures 26A-D. The plurality of apertures 26A-D extend axially through the valve housing 12, illustratively the lower housing body 20 of the valve housing 12, and open into the valve cavity 24.

The lower housing body 20 includes a bottom plate 20P, an outer rim 20R, and a locator tab 20T as shown in FIG. 2. The bottom plate 20P defines the plurality of apertures 26A-D that extend axially therethrough and are spaced apart circumferentially about the valve axis A. The outer rim 20R extends axially from an outer edge of the bottom plate 20P. The locator tab 20T extends axially from the bottom plate 20P along the valve axis A into the valve rotor 30 to position and center the valve rotor 30 in the valve cavity 24. In the illustrative embodiment, the upper housing body 22 couples with the outer rim 20R of the lower housing body 20.

In the illustrative embodiment, each aperture 26A-D has a partition 26P as shown in FIGS. 2 and 7A-11B. The partition 26P extends across the aperture 26A-D to divide the associated aperture 26A-D into sections, like the partition 42P of the through hole 42. The partition 42P of the through hole 42 aligns with the partitions 26P of the apertures 26A-D as the valve rotor 30 rotates and in each of the predetermined positions. In some embodiments, the partitions 26P are omitted. As shown in FIGS. 7A-11B the intersection points 54P, 56P of each shell end wall 54, 56 are aligned with and follow the partitions 26P as the valve rotor 30 rotates about the valve axis A. The partitions 26P are aligned with the circumferential line C in the illustrative embodiment.

The valve flow controller 14 includes the valve rotor 30 arranged in the valve cavity 24 of the valve housing 12 and the actuator 31 as shown in FIGS. 2-4B. The valve rotor 30 is configured to rotate relative to the valve housing 12 about the valve axis A. The valve rotor 30 cooperates with the valve housing 12 to define the plurality of flow paths when the valve rotor 30 is rotated about the valve axis A to the plurality of different predetermined positions to control the flow of fluid through the valve housing 12. The actuator 31 and/or the multi-way valve 10 may include a control unit that is preprogrammed with the different modes to direct the valve flow controller 14.

In the illustrative embodiment, the valve rotor 30 includes the valve rotor body 32 and the valve rotor shaft 34 as shown in FIGS. 2-4A. The valve rotor body 32 includes the valve rotor disc plate 36, a bias mount 38, and the weir shell 40 as shown in FIGS. 2-11B. The valve rotor disc plate 36 extends circumferentially about the valve axis A. The weir shell 40 extends axially from the valve rotor disc plate 36 and circumferentially partway about the valve axis A to create the cavity 50. The bias mount 38 extends from the weir shell 40 in the illustrative embodiment. In other embodiments, the bias mount 38 may extend from the valve rotor disc plate 36. The bias mount 38 receives the bias element 66 of the sealing system 18 to position the bias element 66 axially between the valve housing 12 and valve rotor 30.

The valve rotor disc plate 36 is formed to include at least one a through hole 42 opposite the weir shell 40 as shown FIGS. 3-4B. The through hole 42 aligns with the other two apertures 26A-D included in the plurality of apertures 26A-D that open into the valve cavity 24 when the valve rotor 30 is in each of the plurality of different predetermined positions. In this way, the fluid may flow between the adjacent apertures 26A-D by flowing through the valve cavity 24. In some embodiments, the valve rotor disc plate 36 may include separate through holes 42A, 42B that align with the respective adjacent apertures 26A-D in the valve housing 12 when the valve rotor 30 is in each of the plurality of different predetermined positions.

The bias mount 38 has a center post 44 and outer mount walls 46A, 46B as shown in FIGS. 3-4B. The center post 44 extends axially from the weir shell 40 along a bias axis B. The outer mount walls 46A, 46B extends axially from the weir shell 40 and circumferentially partway around the bias axis B on opposing sides of the center post 44. In other embodiments, a single outer wall may extend circumferentially about the bias axis B to surround the center post 44. The bias element 66 of the sealing system 18 is arranged around the center post 44 such that the bias element 66 is radially between the outer mount walls 46A, 46B and the center post 44 relative to the bias axis B.

In the illustrative embodiment, the bias mount 38 further includes a cap 48 that couples to the center post 44. The cap 48 is arranged over the bias element 66 so that the cap 48 is located axially between the upper housing body 22 and the bias element 66. The upper housing body 22 engages the cap 48 when the upper housing body 22 is coupled to the lower valve housing body 20 to load the bias member 66 when the valve rotor 30 is arranged in the valve cavity 24.

The center post 44 is offset from the valve rotor shaft 34, or in other words, the bias axis B is offset from the valve axis A. The bias axis B is offset from the valve axis A so that the bias element 66 of the sealing system 18 applies a bias force over the weir shell 40, ensuring engagement of the seal elements 62, 64 with the valve housing 12 to reduce leakage to/from the cavity 50.

The weir shell 40 includes the shell body wall 52, the first shell end wall 54, and the second shell end wall 56 as shown in FIGS. 3-11B. The bias mount 38 extends axially from the shell body wall 52 in between the end walls 54, 56. The shell body wall 52 defines the main cavity section 50A and the shell end walls 54, 56 each define an end cavity section 50B, 50C in fluid communication with the main cavity section 50A. The main cavity 50A, the first end cavity 50B, and the second end cavity 50C define the cavity 50.

The sealing system 18 includes seal elements 62, 64 and the bias element 66 as shown in FIGS. 3-5B. The seal elements 62, 64 are arranged axially between the valve rotor 30 and the valve housing 12 to seal therebetween. The bias element 66 is configured to apply an axial force F on the valve rotor 30 to urge the valve rotor 30 toward the lower valve housing body 20 of the valve housing 12 to improve sealing between the valve rotor 30 and the valve housing 12.

In the illustrative embodiment, the seal elements 62, 64 are arranged axially between the valve rotor disc plate 36 of the valve rotor 30 and the lower housing body 20 of the valve housing 12. One seal element 62 extends around the outer perimeter of the weir shell 40. Another seal element 64 extends around the through hole 42. In embodiments with multiple through holes 42, the sealing system 18 may include a seal element for each through hole 42. In other embodiments, the sealing system 18 includes a single seal element that extends around the different cavities and holes.

In some embodiments, at least one of seal elements 62, 64 are coupled to the valve rotor 30. In the illustrative embodiment, both seal elements 62, 64 are coupled to the valve rotor disc plate 36 of the valve rotor 30. The seal elements 62, 64 may be overmolded onto the valve rotor body 32 like as shown in FIGS. 3-5B. In other embodiments, the seal elements 62, 64 may be another suitable seal coupled to the valve rotor 30. In some embodiments, the seal elements 62, 64 may be press-fit seals. In some embodiments, the seal elements 62, 64 may be O-ring seals. In other embodiments, the seal elements 62, 64 may be another suitable seal.

The bias element 66 is a spring in the illustrative embodiment. The spring may be a compression spring, a coil spring, a wave spring, a leaf spring, a disc spring, or another type of suitable spring. In some embodiments, the bias element 66 may be another suitable bias member.

In the illustrative embodiment, the multi-way valve 10 is a 4-way valve and the valve housing 12 includes at least four apertures 26A-D. In some embodiments, the multi-way valve 10 may be a 5-way valve and the valve housing 12 includes at least five apertures 26. In some embodiments, the multi-way valve 10 may be a 6-way valve and the valve housing 12 includes at least six apertures 26. In some embodiments, the number of apertures 26 in the valve housing 12 may be more than 6.

In some embodiments, the multi-way valve 10 may be a 2-way valve. In some embodiments, the multi-way valve 10 may be a 3-way valve. In some embodiments, the multi-way valve 10 may be a 7-way valve. In some embodiments, the multi-way valve 10 may be an 8-way valve. In some embodiments, the multi-way valve 10 may be a 9-way valve. The flow regulator may be incorporated into any multi-way valve (e.g. whether the multi-way valve 10 is a 2-way valve, a 3-way valve, 4-way valve, a 5-way valve, a 6-way valve, a 7-way valve, an 8-way valve, or a 9-way valve) like those shown in U.S. Patent Application No. 2024/0117888, U.S. Patent Application No. 2024/0263709, U.S. Patent Application No. 20240318733, all of which are incorporated herein by reference.

Depending on the number apertures 26 or the number of modes the multi-way valve 10 has (e.g. whether the multi-way valve 10 is a 2-way valve, a 3-way valve, 4-way valve, a 5-way valve, a 6-way valve, a 7-way valve, an 8-way valve, or a 9-way valve) the valve rotor 30 may have multiple weir shells 40 that extend from the valve rotor disc plate 36. The weir shells 40 may be spaced apart circumferentially relative to the valve axis A so that the different weir shells 40 extend around at least two apertures included in the plurality of apertures when the valve rotor 30 is in each of the plurality of different predetermined positions. For example, one weir shell 40 may extend around a first two adjacent apertures and another weir shell 40 may extend around two different adjacent apertures in any one of the plurality of predetermined positions.

For the purposes of the present disclosure, the modifier "about" means±5% of a given valve. Of course, greater or lesser deviation is contemplated and may be used in processed methods within the spirit of this disclosure.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

The invention claimed is:

1. A multi-way valve comprising:

a valve housing coupled to a manifold of thermal fluid circuits, the valve housing shaped to include a valve cavity and a plurality of apertures that open into the valve cavity, a valve flow controller including a valve rotor arranged in the valve cavity of the valve housing and configured to rotate relative to the valve housing about a valve axis and an actuator coupled to the valve rotor to drive rotation of the valve rotor about the valve axis, wherein the valve rotor cooperates with the valve housing to define a plurality of flow paths when the valve rotor is rotated about the valve axis to a plurality of different predetermined positions to control a flow of fluid through the valve housing, and regulating means for controlling a flow rate of fluid entering one flow path of the plurality of flow paths through the multi-way valve when the valve rotor is rotated from one position included in the plurality of different predetermined positions to another position included in the plurality of different predetermined positions so that the flow rate through the one flow path is increased while lowering the pressure in the multi-way valve, wherein the valve rotor is shaped to include a valve rotor disc plate that extends circumferentially about the valve axis and a weir shell that extends around at least two apertures included in the plurality of apertures that open into the valve cavity when the valve rotor is in each of the plurality of different predetermined positions, wherein the weir shell provides the regulating means for controlling flow rate of fluid entering one of the plurality of flow paths through the multi-way valve, wherein the weir shell includes a shell body wall that defines a main cavity and shell end walls that each define an end cavity in fluid communication with the main cavity, wherein each shell end wall extends from the valve rotor disc plate to the shell body wall at a weir angle relative to the valve rotor disc plate, and wherein the weir angle is less than 90 degrees.

2. The multi-way valve of claim 1, wherein the valve rotor includes a valve rotor body and a valve rotor shaft that extends axially relative to the valve axis, the valve rotor body including the valve rotor disc plate that extends circumferentially about the valve axis and the weir shell.

3. The multi-way valve of claim 2, wherein each shell end wall is shaped to control flow from the main cavity to the end cavity in accordance with a preselected flow area curve.

4. The multi-way valve of claim 3, wherein each shell end wall has a first section and a second section that extend from the shell body wall at and converge at an intersection point, and wherein an intersection angle is defined between the first section and the second section.

5. The multi-way valve of claim 2, wherein the valve rotor disc plate is shaped to include a through hole spaced apart from the weir shell that extends axially through the valve rotor disc plate and circumferentially partway about the valve axis.

6. The multi-way valve of claim 1, wherein the plurality of apertures formed in the valve housing includes at least four apertures.

7. The multi-way valve of claim 6, wherein the plurality of apertures formed in the valve housing includes at least five apertures.

8. The multi-way valve of claim 7, wherein the plurality of apertures formed in the valve housing includes at least six apertures.

9. A multi-way valve comprising:

a valve housing coupled to a manifold of thermal fluid circuits, the valve housing shaped to include a valve cavity and a plurality of apertures that open into the valve cavity, and a valve flow controller including a valve rotor arranged in the valve cavity of the valve housing and configured to rotate relative to the valve housing about a valve axis, wherein the valve rotor cooperates with the valve housing to define a plurality of flow paths when the valve rotor is rotated about the valve axis to a plurality of different predetermined positions to control a flow of fluid through the valve housing, wherein the valve rotor is shaped to include a valve rotor disc plate that extends circumferentially about the valve axis and a weir shell that extends around at least two apertures included in the plurality of apertures when the valve rotor is in each of the plurality of different predetermined positions and is configured to control a flow rate of fluid entering one flow path of the plurality of flow paths through the multi-way valve when the valve rotor is rotated from one position included in the plurality of different predetermined positions to another position included in the plurality of different predetermined positions so that the flow rate through the one flow path is increased while lowering the pressure in the multi-way valve, wherein the weir shell includes a shell body wall that defines a main cavity and shell end walls that each defined an end cavity in fluid communication with the main cavity, wherein each shell end wall extends from the valve rotor disc plate of the valve rotor to the shell body wall at a weir angle relative to the valve rotor disc plate, and wherein the weir angle is less than 90 degrees.

10. The multi-way valve of claim 9, wherein each shell end wall is shaped to control flow from the main cavity to the end cavity in accordance with a preselected flow area curve.

11. The multi-way valve of claim 9, wherein each shell end wall has a first section and a second section that extend from the shell body wall and converge at an intersection point, and wherein an intersection angle is defined between the first section and the second section.

12. The multi-way valve of claim 9, wherein the valve rotor includes a valve rotor body and a valve rotor shaft that extends axially relative to the valve axis, the valve rotor body including the valve rotor disc plate that extends circumferentially about the valve axis and the weir shell, and the valve rotor disc plate is shaped to include a through hole spaced apart from the weir shell that extends axially through the valve rotor disc plate and circumferentially partway about the valve axis.

13. The multi-way valve of claim 9, wherein the plurality of apertures formed in the valve housing includes at least four apertures.

14. The multi-way valve of claim 9, wherein the plurality of apertures formed in the valve housing includes at least five apertures.

15. The multi-way valve of claim 9, wherein the plurality of apertures formed in the valve housing includes at least six apertures.

* * * * *